United States Patent
Yang et al.

(10) Patent No.: US 10,526,211 B2
(45) Date of Patent: Jan. 7, 2020

(54) METHOD OF PRODUCING A HIGHLY-PURE ALUMINUM HYDROXIDE

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yanpeng Yang, Beijing (CN); Aizeng Ma, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 17 days.

(21) Appl. No.: 15/656,079

(22) Filed: Jul. 21, 2017

(65) Prior Publication Data

US 2018/0022613 A1 Jan. 25, 2018

(30) Foreign Application Priority Data

Jul. 21, 2016 (CN) .......................... 2016 1 0579053

(51) Int. Cl.
*C01F 7/42* (2006.01)
(52) U.S. Cl.
CPC ...................... *C01F 7/42* (2013.01)
(58) Field of Classification Search
CPC ...................... C01F 7/42; C01F 7/36
See application file for complete search history.

(56) References Cited

U.S. PATENT DOCUMENTS

| 3,419,352 A | 12/1968 | Acciarri et al. |
| 3,773,691 A | 11/1973 | Leach |

(Continued)

FOREIGN PATENT DOCUMENTS

| CN | 85100218 A | 8/1986 |
| CN | 1341559 A | 3/2002 |

(Continued)

OTHER PUBLICATIONS

Chinese Patent Office, First Office Action and First Search Report for CN 201710589972.2, dated Feb. 25, 2019.

(Continued)

*Primary Examiner* — James A Fiorito
(74) *Attorney, Agent, or Firm* — Novick, Kim & Lee, PLLC; Allen Xue

(57) ABSTRACT

A method of producing a highly-pure aluminum hydroxide, comprising the following steps: (1) reacting alcohol with metal aluminum to produce aluminum alkoxide, then hydrolyzing the aluminum alkoxide with water to produce an aluminum hydroxide slurry and an alcohol, filtering the aluminum hydroxide slurry, washing a resulting filter cake with water to remove the alcohol trapped therein, and drying the filter cake after the water washing to produce an aluminum hydroxide powder, (2) sending the alcohol-containing water produced in step (1) to an alcohol extraction unit for separating water and alcohol through extraction, and sending the separated water back to step (1) for recycling, (3) dehydrating the hydrous alcohol produced by hydrolyzing the aluminum alkoxide in step (1) before using it as the raw materials for reacting metal aluminum with alcohol to produce aluminum alkoxide in step (1). The method can improve the recovery of alcohol, reduce the production cost of a highly-pure aluminum hydroxide, improve the purity of (Continued)

aluminum oxide and achieve a zero discharge of sewage by recycling water.

18 Claims, 1 Drawing Sheet

(56) References Cited

U.S. PATENT DOCUMENTS 3,987,155 A    10/1976  Ziegenhain
4,242,271 A *  12/1980  Weber .................... B01J 8/0015
                                                       422/609

FOREIGN PATENT DOCUMENTS

| CN | 1374251 A | 10/2002 |
|----|-----------|---------|
| CN | 101700900 A | 5/2010 |

OTHER PUBLICATIONS

Wangxing Li, "Theory and Technics of Alumina Production", p. 351, Dec. 2010, Central South University Press, ISBN 978-7-5487-0156-9.

Youyuan Dai et ail, "Organic complex extraction chemistry", pp. 139-141, Chemical Industry Press, Beijing, China, Apr. 2003, ISBN 7-5025-4402-X.

* cited by examiner

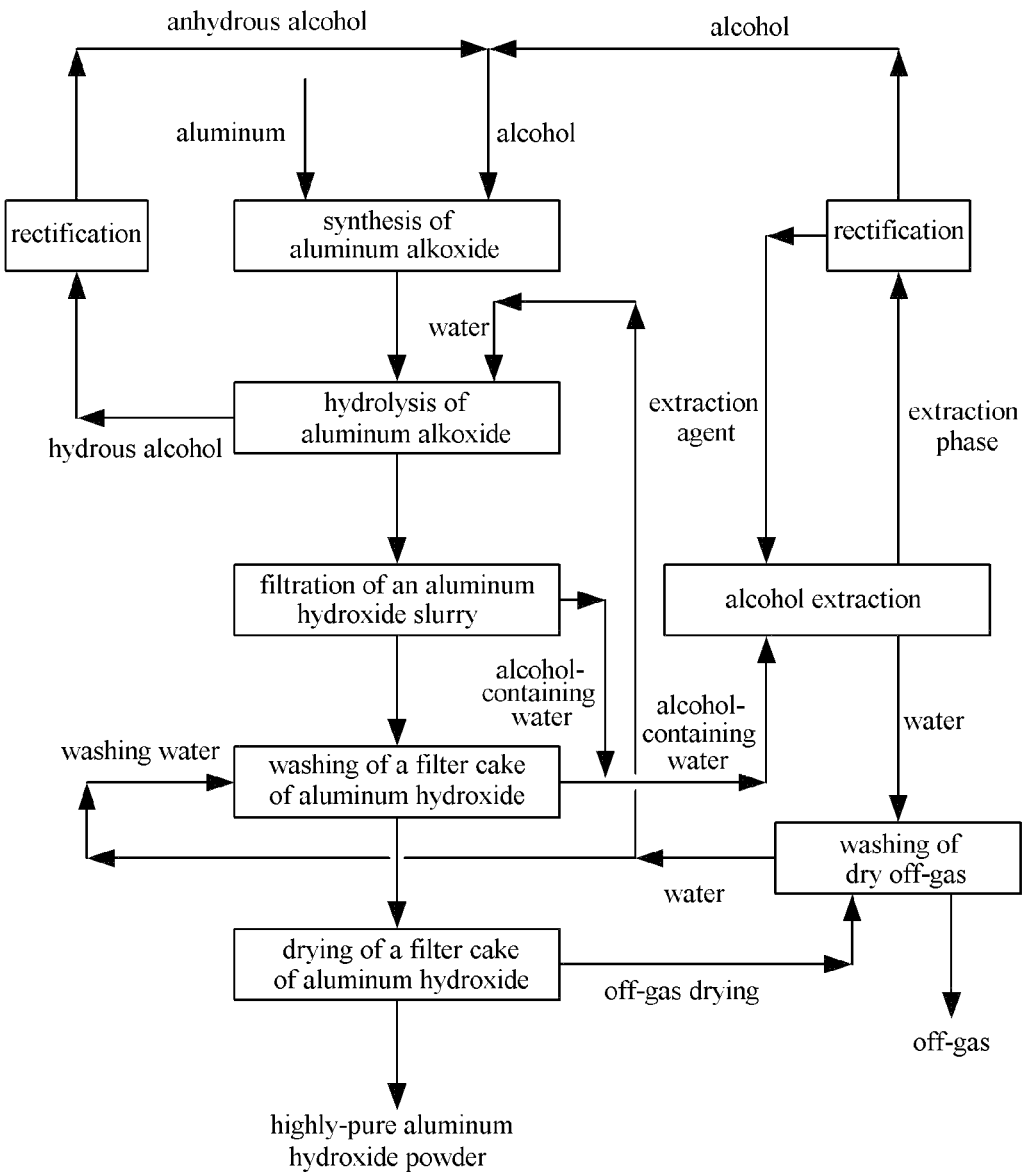

US 10,526,211 B2

METHOD OF PRODUCING A HIGHLY-PURE ALUMINUM HYDROXIDE

TECHNICAL FIELD

The present invention is a method of producing a highly-pure aluminum hydroxide, specifically, a method of producing a highly-pure aluminum hydroxide by using metal aluminum and alcohol as raw materials.

BACKGROUND TECHNOLOGY

Aluminum hydroxide is widely used in the fields such as petroleum refining, chemical engineering, ceramics, building materials, military and defense and the like. Aluminum oxide produced by calcination of aluminum hydroxide is one of the most widely-used catalyst carriers in the field of petroleum refining and chemical engineering, and also a raw material for the production of ceramics, abrasives and the like. There are many processes for manufacturing aluminum hydroxide. For example, bauxite is used as a raw material in traditional processes, undergoing steps such as high temperature calcination, alkali solution leaching, acid neutralization, drying and the like. $NaAlO_2$—$CO_2$ precipitation (which is referred to as $CO_2$ method in short), $NaAlO_2$—$Al_2(SO_4)_3$ precipitation (which is referred to as $Al_2(SO_4)_3$ method in short) may also be used. Aluminum hydroxide produced by these methods can also meet use requirements in the fields such as petrochemical industry in terms of the aspects such as specific surface area, pore volume, pore size, adsorption capacity and the like, for example, as hydrogenation catalyst carrier. However, aluminum hydroxides produced by the above methods usually have a low level of purity. Some fields which have high requirements on the purity of aluminum hydroxide, for example, the fields like continuous reforming catalyst carrier, special ceramics, fine chemical engineering, usually require a highly-pure aluminum oxide having a purity of above 99.9%. Aluminum hydroxides produced by the above technical routes cannot meet the above requirement.

A production of aluminum hydroxide by hydrolysis of aluminum alkoxide is an effective route for producing a highly-pure aluminum hydroxide and aluminum oxide. Such a process comprises reacting alcohol with metal aluminum to produce aluminum alkoxide, hydrolyzing the aluminum alkoxide to produce aluminum hydroxide slurry, and drying the slurry to produce a highly-pure aluminum hydroxide powder.

CN85100218A puts forward a process of preparing a highly-pure aluminum hydroxide by hydrolysis of aluminum alkoxide, comprising reacting metal aluminum with isopropanol to produce aluminum isopropoxide in the presence of a catalyst, hydrolyzing to produce aluminum hydroxide, and then calcinating to produce aluminum oxide. The application adopts a hydrous alcohol produced in the hydrolysis of aluminum alkoxide and a low carbon aluminum alkoxide for hydrolysis, dehydrates a hydrous low carbon alcohol to be below 0.2% while hydrolyzing the low carbon aluminum alkoxide, such that it can be recycled for use in the synthesis of the low carbon aluminum alkoxide. However, the process requires a manner of vacuum distillation to separate the low carbon alcohol and the aluminum hydroxide slurry and is highly energy consuming. In the meantime, during the process of vacuum distillation, the unreacted low carbon aluminum alkoxide is allowed for polymerization and decomposition. In addition, the process does not mention a method of recovering the alcohol trapped in the aluminum hydroxide slurry.

U.S. Pat. No. 3,419,352 discloses a process for producing alpha alumina monohydrate. One technical difficulty for the production of aluminum hydroxide by hydrolysis of aluminum alkoxide is that it is difficult to recover alcohols absorbed by aluminum hydroxide. It puts forwards a process of preparing a highly-pure aluminum hydroxide by hydrolysis of aluminum alkoxide. In the process, a small amount of an aqueous solution of ammonia is added during the process of hydrolysis. The content of $NH_3$ in the aqueous solution of ammonia is from 1.8 to 3.4 wt. %. Due to the addition of the aqueous solution of ammonia, the recovery rate of alcohol is increased. Moreover, within a certain range, as the addition amount of the aqueous solution of ammonia increases, the recovery rate of alcohol increases. The recovery rate of alcohol mentioned in the patent may be as high as 99.65%. The biggest disadvantage of this process is that the addition of the aqueous solution of ammonia cannot completely avoid an absorption of alcohols by aluminum hydroxide slurry. A manner of solvent extraction is further required to remove alcohols trapped in the slurry. In the meantime, the addition of the aqueous solution of ammonia often results in that the off-gas emission from industrial devices does not meet the requirement of environment protection.

U.S. Pat. No. 3,773,691 also adopts a hydrolysis of aluminum alkoxide to produce a highly-pure aluminum hydroxide. However, the patent does not use a manner of adding an aqueous solution of ammonia during the process of hydrolysis. It puts forward the following process route: hydrolyzing aluminum alkoxide to produce an aluminum hydroxide slurry phase and an organic phase, separating the slurry phase and the organic phase, then adding an organic solvent to the slurry phase for a further extraction and separation of alcohol in the slurry, wherein the organic solvent is selected from $C_2$-$C_4$ alcohol, then further separating the organic phase for extraction trapped in the aluminum hydroxide slurry through the steam stripping so as to recover alcohol. The process is complicated, involves a long procedure and is highly energy consuming. Meanwhile, the physical property of the aluminum hydroxide is affected to a certain degree due to the steam stripping.

U.S. Pat. No. 3,987,155 discloses a method of producing aluminum alkoxide by reacting metal aluminum with alcohol ($C_1$-$C_{30}$ alcohol), hydrolyzing aluminum alkoxide to produce an aluminum hydroxide slurry and alcohol, separating the alcohol, filtering the aluminum hydroxide slurry to produce a filter cake, mixing an organic solvent with the filter cake, wherein the organic solvent is selected from the group consisting of ethanol, propanol, butanol, and the organic solvent is added in an amount which can at least azeotropically remove all the water present in the slurry, preferably the organic solvent is added in an amount equal to from 100 to 150 percent of the alcohol amount required to azeotropically remove all the water present. The resulting product has the features of high pore volume and low bulk density. However, the consumption amount of organic solvents while carrying out the process is even larger.

SUMMARY OF THE INVENTION

The objective of the present invention is to provide a method of producing a highly-pure aluminum hydroxide. The method can increase the recovery rate of alcohol and allows the water of the production process to be recycled at the same time.

The method of producing a highly-pure aluminum hydroxide provided in the present invention comprises the following steps:

(1) reacting alcohol with metal aluminum to produce aluminum alkoxide, then hydrolyzing the aluminum alkoxide with water to produce an aluminum hydroxide slurry and alcohol, filtering the aluminum hydroxide slurry, washing a resulting filter cake with water to remove the alcohol trapped therein, and drying the filter cake after washing with water to produce an aluminum hydroxide powder, (2) sending the alcohol-containing water produced in step (1) to an alcohol extraction unit for separating water and alcohol through extraction, and sending the separated water back to step (1) for recycling, (3) dehydrating the hydrous alcohol produced by hydrolyzing the aluminum alkoxide in step (1) before using it as the raw materials for reacting metal aluminum with alcohol to produce aluminum alkoxide in step (1).

The method according to the present invention uses aluminum and excess alcohol as raw materials for a continuous production of a highly-pure aluminum hydroxide, adopts a manner of washing the filter cake with water, extracting and recovering the alcohol in the alcohol-containing water to dramatically improve the recovery rate of alcohol. In the meantime, it also makes full use of the water used in the process, wherein separating alcohol and water through extraction can recycle the water present in the reaction system and achieve a zero sewage discharge in the whole process.

DESCRIPTION OF THE DRAWINGS

FIG. 1 is a schematic diagram of the method according to the present invention.

SPECIFIC EMBODIMENTS

The method according to the present invention uses metal aluminum and alcohol as reaction raw materials, produces a highly-pure aluminum hydroxide by hydrolysis of aluminum alkoxide, and removes the alcohol trapped therein by filtrating, washing, drying the aluminum hydroxide slurry produced by hydrolysis of aluminum alkoxide. From the alcohol-containing water produced after filtrating and washing the aluminum hydroxide slurry, the alcohol therein is separated by a solvent extraction, wherein the alcohol is soluble in a solvent, i.e. an extraction agent and is re-used after separation. The water after dealcoholization can further be recycled. The method according to the present invention, as compared to the prior art, dramatically improves the recovery rate of alcohol, not only reduces the production cost of the highly-pure aluminum hydroxide, but also significantly reduces the content of carbon residue in the product of aluminum hydroxide, and increases the purity of the product. In addition, the present invention achieves a water recycling within the process and a zero sewage discharge.

The alcohol-containing water according to the present invention mainly refers to the water containing alcohol, which is produced after filtrating and/or washing the aluminum hydroxide slurry, which may optionally comprise the alcohol-containing water produced in other steps. The alcohol content in the alcohol-containing water is less than 50 wt. %, preferably from 0.1 to 10 wt. %, more preferably from 0.1 to 8 wt. %.

The hydrous alcohol according to the present invention refers to the alcohol containing an amount of water, which is separated from the aluminum hydroxide slurry and alcohol produced after hydrolysis of aluminum alkoxide. The content of water in the hydrous alcohol is less than 50 wt. %, preferably from 1 to 30 wt. %.

Step (1) in the method according to the present invention is the production of aluminum hydroxide: filtrating the slurry produced after hydrolysis of aluminum alkoxide, drying the filter cake with gas after a water washing. The produced dry off-gas is preferably further washed with water to remove the alcohol therein. The water used for washing the off-gas produced during the process of drying the filter cake is preferably the water produced by the extraction and the separation in step (2). Preferably, the water obtained after water washing the off-gas from the process of drying the filter cake is used for washing the filter cake and hydrolyzing the aluminum alkoxide.

The alcohol in step (1) may be $C_1$ to $C_{20}$, preferably $C_3$ to $C_{10}$, more preferably $C_4$ to $C_8$ alkanol, i.e. the alkanol is the alcohol in which alkyl is the alkyl which may be n-alkyl or branched alkyl. The metal aluminum is preferably aluminum ingot, aluminum shot, aluminum wire, aluminum block, aluminum skimmings, aluminum powder. The temperature for reacting alcohol with the metal aluminum is preferably from 60 to 230° C., more preferably from 80 to 200° C. The molar ratio of alcohol to metal aluminum is from 2 to 5:1, more preferably from 3 to 5:1. A continuous manner or an intermittent manner may be adopted for synthesis of aluminum alkoxide.

In step (1), the reaction of metal aluminum with alcohol produces aluminum alkoxide and the hydrolysis of aluminum alkoxide produces alcohol and aluminum hydroxide slurry. The temperature for hydrolyzing aluminum alkoxide with water is preferably from 30 to 95° C., more preferably from 50 to 90° C. The weight ratio of water to aluminum alkoxide is preferably from 0.5 to 5:1, more preferably from 1 to 3:1.

During the process of hydrolyzing the aluminum alkoxide, the aluminum alkoxide and the water are sent cocurrently to a hydrolysis reactor. It is also possible that the water is added to the aluminum alkoxide for hydrolysis or the aluminum alkoxide is added to the water for hydrolysis. Preferably, a manner of adding cocurrently the aluminum alkoxide and the water to the hydrolysis reactor for hydrolysis is used. The alcohol produced after hydrolysis is positioned above the aluminum hydroxide slurry and can be separated for being used again.

The hydrolysis process may be carried out with stirring or without stirring. In order to make sure that the hydrolysis reaction is performed evenly and rapidly, stirring is preferred. The solid content of the aluminum hydroxide slurry produced by hydrolysis is from 7 to 12 wt. %, calculated as aluminum oxide. The alcohol content is from 1 to 30 wt. %. Preferably, the alcohol content in the aluminum hydroxide slurry is from 1 to 18 wt. %. The distribution scope of the diameters of the aluminum hydroxide particles is from 0.5 μm to 1000 μm, preferably from 1 μm to 800 μm, in the aluminum hydroxide slurry produced by hydrolysis, wherein the volume ratio of the particles with a diameter above 10 μm to the total particles is not less than 75%, preferably not less than 80%. The median diameter (D50) of the particles is from 40 μm to 200 μm, preferably from 40 μm to 100 μm. Therein the median diameter means that 50% by volume of the total particles possess a diameter which is less than the median diameter, and another 50% by volume of the total particles possess a diameter which is larger than the median diameter. The aluminum hydroxide slurry produced by hydrolysis is directly filtered. The filtering may be carried out by circulating filtration, multi-stage filtration, vacuum filtration, cross-flow filtration and the like with filter cloth or filter net.

The filtered water obtained by filtration of the aluminum hydroxide slurry is an alcohol-containing water due to the presence of a certain amount of alcohol and is directly sent to the alcohol extraction unit in step (2). After filtration, a majority of alcohol contained in the aluminum hydroxide slurry is left in the aluminum hydroxide filter cake. The filter cake is washed with water for a purpose of removing the alcohol trapped in the filter cake. The temperature for washing the filter cake with water is preferably from 40 to 90° C. The times for washing the filter cake with water are from 1 to 3 times. Each time of washing is one stage. The first water washing of the filter cake after filtration is the first stage. The stage increases each time afterwards. The wash solution produced from the last time of washing is preferably used as the washing water for the previous stage. It is also possible that the washing water from off-gas washing is directly used in each time of washing. The amount of water used for washing the filter cake is preferably from 1 to 10 times the weight of the filter cake, more preferably from 2 to 8 times the weight of the filter cake. Filtration of the aluminum hydroxide slurry and washing of the filter cake are preferably accomplished by a method which filtration and washing are carried out at the same time in each stage of a multi-stage treatment.

The filter cake obtained from the water washing needs to be dried. Basic procedures for drying the filter cake are provided as follows: the aluminum hydroxide filter cake wet feed is sent to a micro-powder dryer which is a multi-functional dryer integrated with stirring, drying and crushing and whose main function is to crush and dry the aluminum hydroxide filter cake sent therein, the dryer mainly comprising a stirrer, a rotating feeder and a drying column, wherein the stirrer mainly breaks the aluminum hydroxide filter cake and the rotating feeder contacts the broken feed with a high-temperature gas stream. The high-temperature gas stream, i.e. a gas stream for drying, may be an air stream, or a stream of inert gas, such as nitrogen gas, helium gas, argon gas and the like, preferably an air stream. The temperature for the air stream is from 200 to 400° C., preferably from 220 to 350° C. The drying process is accomplished inside the drying column. After the drying is accomplished, a bag filler is used to collect aluminum hydroxide powder while separating the gas phase and the solid phase at the same time. The separated gas is a dry off-gas which is further washed with water to remove the alcohol therein. The dry off-gas may be sent to a water-washing column for water washing. The alcohol in the gas phase is soluble in water for a further recovery of alcohol. The temperature in the water-washing column of the dry off-gas is preferably from 20 to 90° C., more preferably from 25 to 80° C.

Step (2) in the method according to the present invention aims to extract and separate the alcohol-containing water obtained in step (1) during the process of producing aluminum hydroxide. The alcohol content in the alcohol-containing water is less than 50 wt. %. The alcohol-containing water is the filtrate obtained after filtrating the aluminum hydroxide slurry and/or the wash solution after water washing the filter cake in step (1), and also the alcohol-containing water produced by water washing the off-gas produced during the process of drying the filter cake.

An extraction agent used for separating water and alcohol through extraction in step (2) is preferably $C_6$-$C_9$ arene or $C_6$-$C_9$ alkane. The weight ratio of the extraction agent to the raw material to be extracted is from 0.02 to 1:1, preferably from 0.02 to 0.5:1. The temperature for the extraction and the separation of water and alcohol is preferably from 50 to 90° C.

After the extraction and separation in step (2), a resulting extraction phase is subjected to rectification to separate the extraction agent and the alcohol. The extraction agent is recycled and the alcohol is used in the raw materials for reacting metal aluminum with alcohol to produce aluminum alkoxide in step (1).

Step (3) according to the present invention aims dehydrate the hydrous alcohol produced by hydrolysis of aluminum alkoxide through rectification. The hydrous alcohol contains a certain amount of water. If the alcohols selected are different, water contents are also different. The water content in the alcohol is less than 50 wt. %, generally between 1 and 30 wt. %. The alcohol produced by the rectification and the dehydration is used as the raw materials for reacting metal aluminum with alcohol. The water obtained from the rectification and the dehydration is used in the water for hydrolysis of aluminum alkoxide.

FIG. 1 is a schematic figure of the method according to the present invention. It can be learned from FIG. 1 that the reaction of aluminum and alcohol synthesizes aluminum alkoxide; aluminum alkoxide and water are subjected to hydrolysis; a resulting aluminum hydroxide slurry is filtered; a resulting filter cake is washed with water; the wash solution produced by washing is an alcohol-containing water; an aluminum hydroxide filter cake obtained after water washing is dried to produce a highly-pure aluminum hydroxide powder. Both a filtrate obtained after filtrating the aluminum hydroxide slurry and a wash solution obtained after water washing the filter cake are alcohol-containing waters, which are extracted to produce an extraction phase which is an extraction agent rich in alcohol. Upon the rectification and the separation of the extraction agent and alcohol, the alcohol is sent back to a synthesis step of aluminum alkoxide as raw material and the extraction agent is sent back to the alcohol extraction step for recycling. The water obtained from the extraction and the separation is used for washing the off-gas produced during the process of drying the filter cake. The water obtained from washing the dry off-gas is used as the water for washing the filter cake and the water for hydrolysis of aluminum alkoxide. The alcohol produced by hydrolysis of aluminum alkoxide contains a certain amount of water. Upon rectification and dehydration, the resulting alcohol is further used as the raw material for reacting aluminum with alcohol to synthesize aluminum alkoxide and the resulting water may be used as the water for hydrolysis of aluminum alkoxide.

The following Examples are further used to illustrate the present invention. However, the present invention is not limited to these Examples.

EXAMPLE 1

Using metal aluminum and butanol as raw materials, a highly-pure aluminum hydroxide was produced according to the procedure in FIG. 1.

(1) Synthesis of Aluminum Alkoxide

A metal aluminum was added, at a rate of 2.7 kg/h, to a reactor for synthesis of aluminum alkoxide, and also, n-butanol was added, at a rate of 26.7 kg/h meanwhile. By reacting them at 110° C., a mixed solution of aluminum butoxide and unreacted butanol was produced.

(2) Hydrolysis of Aluminum Alkoxide

The said mixed solution and deionized water were added cocurrently to a hydrolysis reactor for hydrolysis at 80° C.

The weight ratio of water to aluminum butoxide was 1.6/1. Hydrolysis was carried out with stirring to produce a two-phase system consisting of n-butanol in the upper layer and aluminum hydroxide slurry in the lower layer. The n-butanol, having a water content of 28.5 wt. %, in the upper layer of the hydrolysis reactor was extracted out, and sent to a rectification column for a rectification treatment. The temperature at the bottom of the rectification column was controlled at 117° C. The n-butanol, having a water content of less than 0.3 wt. %, was discharged from the bottom of the rectification column, sent back to step (1) for synthesis of aluminum butoxide. The resulting water was sent to a water storage tank for hydrolysis in the hydrolysis reactor as the water feed for hydrolysis. The aluminum hydroxide slurry at the lower layer of the hydrolysis column had a solid content of 8.6 wt. %, calculated as aluminum oxide, had a content of n-butanol of 15.3 wt. %, and was sent to a filtration unit and a washing unit, wherein the diameter scope of the aluminum hydroxide particles is from 1 µm to 350 µm, the volume ratio of the particles with a diameter of above 10 µm to the total particles is 82.7%, and the median diameter D50 is 54.1 µm.

(3) Production of a Highly-pure Aluminum Hydroxide

Filtration and washing of the aluminum hydroxide slurry were carried out by a three-stage belt filter for a simultaneous filtration and washing of the aluminum hydroxide. The water for washing was recycled. The wash solution for a third stage of filtration and washing was circulated back to a second stage of washing as the water feed for washing, and the wash solution for the second stage of washing was circulated back to a first stage of filtration and washing as the water feed for washing. The total amount of water for washing was five times the weight of the filter cake. The washing temperature was 75° C. The wash solution obtained after the first stage of filtration and washing was sent to an alcohol extraction unit.

The filter cake obtained after washing was sent to a flash dryer for drying. The temperature at the air inlet of the drying column was 230° C. The dry off-gas was sent to a water-washing column for washing. The water for washing was the water obtained from the alcohol extraction and separation.

The temperature was 25° C. The alcohol-containing water obtained after washing, having an alcohol content of 0.10 wt. %, was used as the water for filtrating and washing the filter cake.

(4) Extraction and Separation of Alcohol-containing Water

The filtrate obtained after filtration of the aluminum hydroxide slurry was combined with the wash solution after washing the filter cake, wherein the content of alcohol was 6.3 wt. %, and it was sent to the middle part of the alcohol extraction column. Trimethylbenzene as an extraction agent was fed to the lower part of the extraction column. The weight ratio of trimethylbenzene to the raw material to be extracted was 0.1:1. Upon extraction, the n-butanol dissolved in water was soluble in trimethylbenzene, and water was discharged from the bottom of the column for washing the dry off-gas in step (3). The operation temperature of the alcohol extraction column was 60° C., and the pressure was 0.2 MPa. The extraction agent rich in butanol was discharged from the top of the column and sent to the rectification column. The operation temperature of the rectification column was 118° C. and the pressure was 0.1 MPa. The butanol separated at the top of the column was sent back to the reactor for synthesis of aluminum alkoxide. A lean extraction agent produced at the bottom of the column was sent back to the alcohol extraction column.

During the above process, the recovery rate of butanol was 95.7 wt. % and the carbon residue value in the resulting aluminum hydroxide powder was 0.21 wt. %.

The particle distribution of the aluminum hydroxide particles in the aluminum hydroxide slurry was obtained by the laser diffraction method, with the apparatus of Malvern Mastersizer 2000 and the analyzing method of GB/T 19077.1-2008. The carbon residue value in the aluminum hydroxide powder was measured by an infrared absorption method with a carbon sulfur analyzer: HORIBA EMIA-820V, according to the analytic method provided by the Research Institute of Petroleum Processing: RIPP 106-90 (petrochemical analytic method (RIPP experimental method)), Yang Cuiding, Gu Kanying, Wu Wenhui, Science Press, 1990).

EXAMPLE 2

Aluminum hydroxide was produced according to the method of Example 1, except that n-pentanol was used as a reaction raw material in step (1). n-pentanol was added, at a rate of 31.7 kg/h, to a reactor for synthesis of aluminum alkoxide to form a mixed solution of aluminum pentyloxide and unreacted n-pentanol. In step (2), the mixed solution and deionized water were added cocurrently to a hydrolysis reactor for hydrolysis at 80° C. The weight ratio of water to aluminum pentyloxide was 1.5/1. The n-pentanol with a water content of 16.2 wt. % released from hydrolysis was rectified and dehydrated and was then sent back to the reactor for synthesis of aluminum alkoxide and the temperature at the bottom of the rectification column was controlled at 137° C. The aluminum hydroxide slurry produced by hydrolysis had a solid content of 9.2 wt. %, calculated as aluminum oxide, and a content of n-pentanol of 6.5 wt. %. The diameter scope of the aluminum hydroxide particles is from 1 µm to 460 µm, wherein the volume ratio of the particles with a diameter of above 10 µm to the total particles is 85.2%, and the median diameter D50 is 63.5 µm. It was subjected to a three-stage of filtration and washing according to the method in step (3) and was then sent to a flash dryer for drying. A dry off-gas was sent to a water-washing column for washing.

The filtrate obtained after filtration of the aluminum hydroxide slurry was combined with the wash solution after washing the filter cake, wherein the content of alcohol was 2.3 wt. %. The alcohol-containing water was extracted and separated according to the method in step (4). The operation temperature of the alcohol extraction column was 60° C., and the pressure was 0.2 MPa. The extraction agent rich in pentanol was discharged from the top of the column and sent to the rectification column. The operation temperature of the rectification column was 138° C. and the pressure was 0.1 MPa. The n-pentanol separated at the top of the column was sent back to the reactor for synthesis of aluminum alkoxide. A lean extraction agent produced at the bottom of the column was sent back to an alcohol extraction column. The water produced by the extraction and the separation was used for washing the dry off-gas in step (3).

During the above process, the recovery rate of n-pentanol was 96.3 wt. % and the carbon residue value in the resulting aluminum hydroxide powder was 0.23 wt. %.

EXAMPLE 3

Aluminum hydroxide was produced according to the method of Example 1, except that n-hexanol was used as a reaction raw material in step (1). n-hexanol was added, at a rate of 38.2 kg/h, to a reactor for synthesis of aluminum alkoxide to form a mixed solution of aluminum n-hexoxide and unreacted n-hexanol. In step (2), the mixed solution and deionized water were added cocurrently to a hydrolysis reactor for hydrolysis at 90° C. The weight ratio of water to aluminum n-hexoxide was 1.3/1. The n-hexanol with a water content of 8.3 wt. % released from hydrolysis was rectified and dehydrated and was then sent back to the reactor for synthesis of aluminum alkoxide and the temperature at the bottom of a rectification column was controlled at 157° C. The aluminum hydroxide slurry produced by hydrolysis had a solid content of 9.5 wt. %, calculated as aluminum oxide, and a content of n-hexanol of 3.2 wt. %. The diameter scope of the aluminum hydroxide particles is from 1 μm to 795 μm, wherein the volume ratio of the particles with a diameter of above 10 μm to the total particles is 87.3%, and the median diameter D50 is 89.1 μm. It was subjected to a three-stage of filtration and washing according to the method in step (3) and was then sent to a flash dryer for drying. A dry off-gas was sent to a water-washing column for washing.

The filtrate obtained after filtration of the aluminum hydroxide slurry was combined with the wash solution after washing the filter cake, wherein the content of alcohol was 1.1 wt. %. The alcohol-containing water was extracted and separated according to the method in step (4), except that toluene was used as the extraction agent; the weight ratio of toluene to the raw material to be extracted was 0.04:1. The operation temperature of the alcohol extraction column was 60° C., and the pressure was 0.2 MPa. The extraction agent rich in n-hexanol was discharged from the top of the column and sent to the rectification column. The operation temperature of the rectification column was 111° C. and the pressure was 0.1 MPa. The n-hexanol separated at the bottom of the column was sent back to the reactor for synthesis of aluminum alkoxide. A lean extraction agent produced at the top of the column was sent back to the alcohol extraction column. The water produced by the extraction and the separation was used for washing the dry off-gas in step (3).

During the above process, the recovery rate of n-hexanol was 96.9 wt. % and the carbon residue value in the resulting aluminum hydroxide powder was 0.21 wt. %.

EXAMPLE 4

Aluminum hydroxide was produced according to the method of Example 1, except that n-heptanol was used as a reaction raw material in step (1). n-heptanol was added, at a rate of 41.8 kg/h, to a reactor for synthesis of aluminum alkoxide to form a mixed solution of aluminum n-heptyloxide and unreacted n-heptanol. In step (2), the mixed solution and deionized water were added cocurrently to a hydrolysis reactor at for hydrolysis 90° C. The weight ratio of water to aluminum n-heptyloxide was 1.2/1. The n-heptanol with a water content of 3.7 wt. % released from hydrolysis was rectified and dehydrated and was then sent back to the reactor for synthesis of aluminum alkoxide, and the temperature at the bottom of a rectification column was controlled at 176° C. The n-heptanol was discharged from the bottom of the rectification column, with a water content of less than 0.3 wt. %. The aluminum hydroxide slurry produced by hydrolysis had a solid content of 9.5 wt. %, calculated as aluminum oxide, and a content of n-heptanol of 2.5 wt. %. The diameter scope of the aluminum hydroxide particles is from 1 μm to 780 μm, wherein the volume ratio of the particles with a diameter of above 10 μm to the total particles is 83.2%, and the median diameter D50 is 78.1 μm, It was subjected to a three-stage of filtration and washing according to the method in step (3) and was then sent to a flash dryer for drying. A dry off-gas was sent to a water washing column for washing. The temperature for filtrating and washing the filter cake was 50° C.

The filtrate obtained after filtration of the aluminum hydroxide slurry was combined with the wash solution after washing the filter cake, wherein the content of alcohol was 0.86 wt. %. The alcohol-containing water was extracted and separated according to the method in step (4), except that toluene was used as the extraction agent; the weight ratio of toluene to the raw material to be extracted was 0.04:1. The operation temperature of the alcohol extraction column was 60° C., and the pressure was 0.2 MPa. The extraction agent rich in n-heptanol was discharged from the top of the column and sent to the rectification column. The operation temperature of the rectification column was 111° C. and the pressure was 0.1 MPa. The n-heptanol separated at the bottom of the column was sent back to the reactor for synthesis of aluminum alkoxide. A lean extraction agent produced at the top of the column was sent back to the alcohol extraction column. The water produced by the extraction and the separation was used for washing the dry off-gas in step (3).

During the above process, the recovery rate of n-heptanol was 97.1 wt. % and the carbon residue value in the resulting aluminum hydroxide powder was 0.22 wt. %.

EXAMPLE 5

Aluminum hydroxide was produced according to the method of Example 1, except that n-octanol was used as a reaction raw material in step (1). n-octanol was added, at a rate of 42.9 kg/h, to a reactor for synthesis of aluminum alkoxide to form a mixed solution of aluminum n-octyloxide and unreacted n-octanol. In step (2), the mixed solution and deionized water were added cocurrently to a hydrolysis reactor for hydrolysis at 90° C. The weight ratio of water to aluminum n-octyloxide was 1.2/1. The n-octanol with a water content of 1.8 wt. % released from hydrolysis was rectified and dehydrated and was then sent back to the reactor for synthesis of aluminum alkoxide and the temperature at the bottom of a rectification column was controlled at 196° C. The aluminum hydroxide slurry produced by hydrolysis had a solid content of 10.3 wt. %, calculated as aluminum oxide, and had a content of n-octanol of 1.6 wt. %. The diameter scope of the aluminum hydroxide particles is from 1 μm to 790 μm, wherein the volume ratio of the particles with a diameter of above 10 μm to the total particles is 85.1%, and the median diameter D50 is 87.5 μm. It was subjected to a three-stage of filtration and washing according to the method in step (3) and was then sent to a flash dryer for drying. A dry off-gas was sent to a water-washing column for washing.

The filtrate obtained after filtration of the aluminum hydroxide slurry was combined with the wash solution after washing the filter cake, wherein the content of alcohol was 0.53 wt. %. The alcohol-containing water was extracted and separated according to the method in step (4). The operation temperature of the alcohol extraction column was 80° C., and the pressure was 0.2 MPa. The extraction agent rich in n-octanol was discharged from the top of the column and sent to the rectification column. The operation temperature of the rectification column was 168° C. and the pressure was 0.05 MPa. The n-octanol separated at the bottom of the column was sent back to the reactor for synthesis of aluminum alkoxide. A lean extraction agent produced at the top of the column was sent back to the alcohol extraction column.

The water produced by the extraction and the separation was used for washing the dry off-gas in step (3).

During the above process, the recovery rate of n-octanol was 97.7 wt. % and the carbon residue value in the resulting aluminum hydroxide powder was 0.19 wt. %.

EXAMPLE 6

Aluminum hydroxide was produced according to the method of Example 1, except that a mixed alcohol of n-butanol and n-octanol was used as a reaction raw material in step (1). The weight ratio of n-butanol to n-octanol was 2/1. n-butanol and n-octanol were added, at a rate of 31.8 kg/h, to a reactor for synthesis of aluminum alkoxide to form a mixed solution of aluminum n-butoxide, aluminum n-octyloxide and unreacted n-butanol and n-octanol. In step (2), the mixed solution and deionized water were added cocurrently to a hydrolysis reactor for hydrolysis at 90° C. The weight ratio of water to aluminum n-butoxide and aluminum n-octyloxide was 1.1/1. The alcohol with a water content of 18.3 wt. % released from hydrolysis was rectified and dehydrated and was then sent back to the reactor for synthesis of aluminum alkoxide and the temperature at the bottom of a rectification column was controlled at 118° C. The aluminum hydroxide slurry produced by hydrolysis had a solid content of 10.3 wt %, calculated as aluminum oxide. The total content of n-butanol and n-octanol was 6.3 wt. %. The diameter scope of the aluminum hydroxide particles is from 1 μm to 570 μm, wherein the volume ratio of the particles with a diameter of above 10 μm to the total particles is 84.9%, and the median diameter D50 is 67.6 μm. It was subjected to a three-stage of filtration and washing according to the method in step (3) and was then sent to a flash dryer for drying. A dry off-gas was sent to a water-washing column for washing.

The filtrate obtained after filtration of the aluminum hydroxide slurry was combined with the wash solution after washing the filter cake, wherein the content of alcohol was 2.1 wt. %. The alcohol-containing water was extracted and separated according to the method in step (4), except that n-heptane was used as the extraction agent; the weight ratio of n-heptane to the raw material to be extracted was 0.05:1. The operation temperature of the extraction column was 80° C., and the pressure was 0.2 MPa. The extraction agent rich in alcohol was discharged from the top of the column and sent to the rectification column. The operation temperature of the rectification column was 100° C. and the pressure was 0.05 MPa. The separated n-butanol and n-octanol were sent back to the reactor for synthesis of aluminum alkoxide. A lean extraction agent was sent back to the alcohol extraction column. The water produced by the extraction and the separation was used for washing the dry off-gas in step (3).

During the above process, the recovery rate of alcohol was 96.9 wt. % and the carbon residue value in the resulting aluminum hydroxide powder was 0.21 wt. %.

COMPARATIVE EXAMPLE 1

A metal aluminum was added, at a rate of 2.7 kg/h, to a reactor for synthesis of aluminum alkoxide, and simultaneously, n-butanol was added, at a rate of 26.7 kg/h. By reacting them at 110° C., a mixed solution of aluminum butoxide and unreacted butanol was produced.

The mixed solution and deionized water were added cocurrently to a hydrolysis reactor for hydrolysis at 80° C. The weight ratio of water to aluminum butoxide was 1.6/1. Hydrolysis was carried out with stirring to a produce a two-phase system consisting of n-butanol in the upper layer and aluminum hydroxide slurry in the lower layer. The n-butanol, having a water content of 28.1 wt. %, in the upper layer of the hydrolysis reactor was extracted out, and sent to a rectification column for a rectification treatment. The temperature at the bottom of the rectification column was controlled at 117° C. The n-butanol, having a water content of less than 0.3 wt. % was discharged from the bottom of the rectification column, and was sent back for synthesis of aluminum alkoxide. The aluminum hydroxide slurry in the lower layer of the hydrolysis column was filtered. The filter cake after filtration was sent directly to a flash dryer column for drying, without undergoing a water washing. The dry air inlet temperature of the drying column was 230° C. An aluminum hydroxide powder was produced by drying.

During the above process, the recovery rate of n-butanol was 87.3 wt. % and the carbon residue value in the resulting aluminum hydroxide powder was 2.61 wt. %.

COMPARATIVE EXAMPLE 2

Aluminum hydroxide power was produced according to the method of Example 1, except that n-heptanol was used to replace n-butanol. n-heptanol was added, at a rate of 41.8 kg/h, to a reactor for synthesis of aluminum alkoxide to produce a mixed solution of aluminum heptyloxide and unreacted n-heptanol. The mixed solution and deionized water were added cocurrently to a hydrolysis reactor for hydrolysis at 90° C. The weight ratio of water to aluminum heptyloxide was 1.2/1.

The n-heptanol, having a water content of 3.9 wt. %, in the upper layer of the hydrolysis column was extracted out, and sent to a rectification column for a rectification treatment. The temperature at the bottom of the rectification column was controlled at 176° C. The n-heptanol, having a water content of less than 0.3 wt. % was discharged from the bottom of the rectification column, and was sent back for synthesis of aluminum alkoxide. The aluminum hydroxide slurry in the lower layer of the hydrolysis column was filtered. The filter cake obtained after filtration was sent directly to a flash dryer column for drying, without undergoing a water washing. The dry air inlet temperature of the drying column was 230° C. An aluminum hydroxide powder was produced by drying.

During the above process, the recovery rate of n-heptanol was 89.5 wt. % and the carbon residue value in the resulting aluminum hydroxide powder was 2.33 wt. %.

It can be learned from the comparison of the above Examples with Comparative Examples that the present invention, by washing the aluminum hydroxide filter cake and adding an extraction and dealcholization treatment of the alcohol-containing water, can dramatically increase the recovery rate of alcohol during the process of producing aluminum hydroxide, reduce the off-gas emission, and is free of sewage discharge, as compared to the conventional methods in the Comparative Examples. In the meantime, the resulting highly-pure aluminum hydroxide product has a low carbon residue value and a purity which is dramatically increased. The production cost of a highly-pure aluminum hydroxide is reduced.

The invention claimed is:

1. A method of producing aluminum hydroxide, comprising:
    (1) reacting alcohol with metal aluminum to produce aluminum alkoxide, then hydrolyzing the aluminum alkoxide with water to produce an aluminum hydroxide slurry and a hydrous alcohol, separating the hydrous alcohol from the aluminum hydroxide slurry, wherein a content of water in the hydrous alcohol is less than 50 wt %, filtering the aluminum hydroxide slurry to obtain a filter cake and a filtrate, washing the filter cake with water to remove the alcohol trapped therein into a wash solution, and drying the washed filter cake to produce an aluminum hydroxide powder, combining the filtrate and the wash solution to obtain an alcohol-containing water, wherein the alcohol-containing water has an alcohol content of less than 50 wt %;

(2) sending the alcohol-containing water to an alcohol extraction unit for separating water and alcohol through extraction, using water separated from the alcohol extraction unit to wash the filter cake, to hydrolyze aluminum alkoxide, or both; and (3) dehydrating the hydrous alcohol produced by hydrolyzing the aluminum alkoxide in step (1), and reacting the resulting anhydrous alcohol with metal aluminum to produce aluminum alkoxide.

2. The method according to claim 1, characterized in that gas is used for drying during the process of drying the filter cake in step (1) and the resulting dry off-gas is further washed with water to remove the alcohol therein.

3. The method according to claim 2, characterized in that the water used for washing the off-gas produced during the process of drying the filter cake is the water produced by the extraction separation in step (2).

4. The method according to claim 3, characterized in that the water obtained after water washing the off-gas from the process of drying the filter cake is used for washing the filter cake and hydrolyzing the aluminum alkoxide.

5. The method according to claim 1, characterized in that the alcohol in step (1) is $C_1$-$C_{20}$ alkanol.

6. The method according to claim 1, characterized in that temperature for reacting alcohol with metal aluminum in step (1) is from 60° C. to 200° C., and molar ratio of alcohol to metal aluminum is from 2 to 5:1.

7. The method according to claim 1, characterized in that a temperature for hydrolyzing the aluminum alkoxide with water in step (1) is from 30° C. to 90° C., and a weight ratio of water to aluminum alkoxide is from 0.5 to 5:1.

8. The method according to claim 1, characterized in that the solid content of the aluminum hydroxide slurry produced by hydrolyzing the aluminum alkoxide in step (1) is from 7 to 12 wt. %, calculated as aluminum oxide.

9. The method according to claim 1, characterized in that the alcohol content of the aluminum hydroxide slurry produced by hydrolyzing the aluminum alkoxide in step (1) is from 1 to 30 wt. %.

10. The method according to claim 1, characterized in that a diameter of the aluminum hydroxide particles is from 0.5 µm to 1000 µm in the aluminum hydroxide slurry obtained by hydrolyzing the aluminum alkoxide in step (1).

11. The method according to claim 1, characterized in that a temperature for washing the filter cake with water in step (1) is from 40° C. to 90° C.

12. The method according to claim 1, characterized in that a number of times for washing the filter cake with water in step (1) is from 1 to 3.

13. The method according to claim 1, characterized in that an amount of washing water in the process of washing the filter cake with water in step (1) is from 1 to 10 times the weight of the filter cake.

14. The method according to claim 1, characterized in that an extraction agent used for separating water and alcohol through extraction in step (2) is $C_6$-$C_9$ arene or $C_6$-$C_9$ alkane.

15. The method according to claim 1, characterized in that the temperature for the extraction separation of water and alcohol in step (2) is from 50° C. to 90° C.

16. The method according to claim 1, further comprising: after the extraction separation in step (2), rectifying a resulting extraction phase to separate the extraction agent from alcohol, and reacting the alcohol with metal aluminum to produce aluminum alkoxide.

17. The method according to claim 14, characterized in that the temperature for the extraction separation of water and alcohol in step (2) is from 50° C. to 90° C.

18. The method according to claim 14, further comprising: after the extraction separation in step (2), rectifying a resulting extraction phase to separate the extraction agent from alcohol, and reacting the alcohol with metal aluminum to produce aluminum alkoxide.

\* \* \* \* \*